May 23, 1933.   P. W. DEMPSEY   1,910,525
MOLD FOR CYLINDER PACKING
Filed Dec. 2, 1929
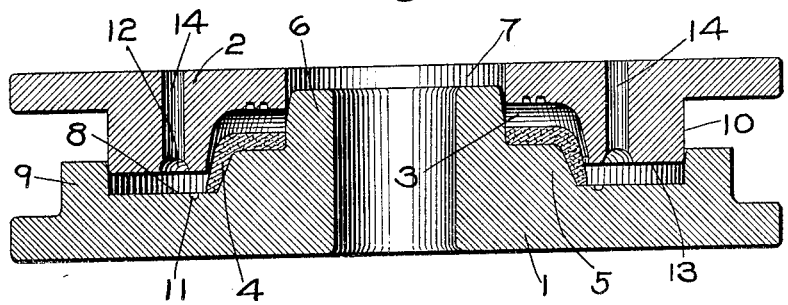
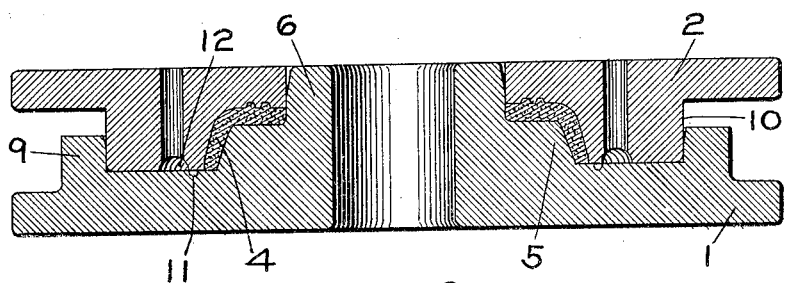
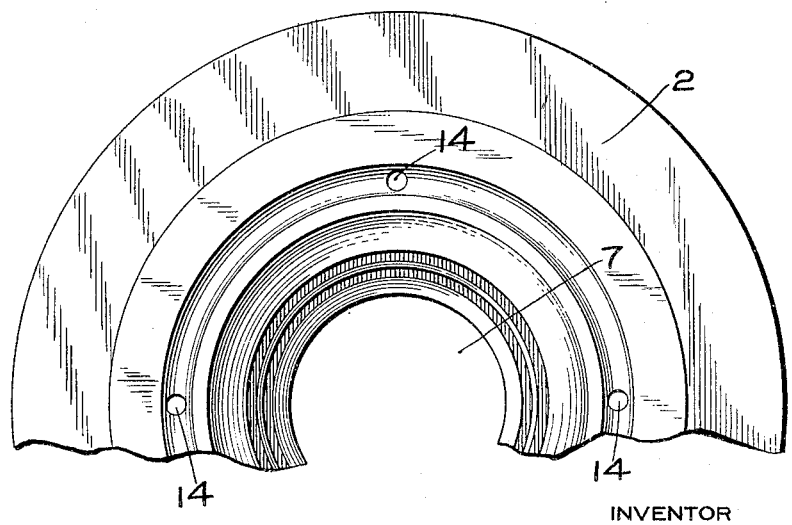
INVENTOR
PHILIP W. DEMPSEY
BY
ATTORNEY Patented May 23, 1933

1,910,525

UNITED STATES PATENT OFFICE

PHILIP W. DEMPSEY, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA

MOLD FOR CYLINDER PACKING

Application filed December 2, 1929. Serial No. 410,968.

This invention relates to molds, and more particularly to a mold for cylinder piston packing, such as the cup-shaped packing employed in brake cylinder pistons.

One object of my invention is to provide a packing mold which will produce packing rings of uniform thickness, both in the individual ring and collectively.

Another object of my invention is to provide a packing mold which will produce packing rings with smooth surfaces.

Where fabric is employed in the packing ring, another object of my invention is to provide a mold for packing rings which will prevent the fabric from flowing out, so that it is exposed in the finished packing.

When the fabric in the packing is permitted to flow out of the mold, it tends to distort the fabric of the packing, so that the strands of fabric are no longer uniformly spaced.

Other objects and advantages will appear in the following more detailed description of the invention.

In the accompanying drawing, Fig. 1 is a sectional view of a packing mold embodying my invention, and showing one section of the mold entering the other section; Fig. 2 a section similar to Fig. 1, showing the sections of the mold in the final position; and Fig. 3 a fragmentary inverted plan view of the female section of the mold.

The mold may comprise a male portion 1 and a female portion 2. The female portion 2 has an annular cavity 3 which conforms to the desired finished outer contour of the packing 4 and the male portion 1 has an annular section 5 which conforms to the desired finished inner contour of the packing.

The male portion 1 is provided with a central cylindrical boss 6, the diameter of which corresponds with the finished diameter of the central opening in the packing ring and the female portion 2 is provided with a central cylindrical opening 7 which has a diameter, such that a close sliding fit on the boss 6 is obtained, when the female portion is applied to the male portion.

The end face of the packing 4 engages a face 8 of the male portion 1 and an annular flange 9 surrounds the face 8, the interior annular face of the flange guiding the peripheral face 10 of the female portion 2.

Near the outer face of the packing, the face 8 is provided with a shallow annular groove 11 and the female portion 2 is provided with an annular groove 12 on the face 13, the inner edge of the groove 12 being in substantial alinement with the outer edge of the groove 11. A plurality of vent holes 14 lead from the groove 12 to the atmosphere.

In operation, the approximately formed packing ring 4 is applied in position in the male portion 1, as shown in Fig. 1, and the female portion 2 is then placed in position on the male portion. The mold is then placed in a suitable press (not shown) and pressure is applied to the mold by the press, forcing the parts of the mold to the position shown in Fig. 2.

Having in mind packing rings composed of fabric and rubber composition, the close sliding fit between the boss 6 and the opening 7 prevents the fabric and little if any of the rubber composition from flowing out, as the female portion 2 is forced down to its final position. Excess material from the packing ring flowing from the lower edge of the packing, flows into the shallow groove 11 and as this shallow groove is filled with excess material, further flow takes place from the shallow groove 11 into the groove 12, which latter groove is large enough to hold all the excess material which might flow from the shallow groove.

As the mold portions approach each other, the opening gap between the grooves 11 and 12 becomes smaller and smaller, so that the gap acts as an outlet orifice, whereby a back pressure or increasing resistance is created to the flow of excess material.

The effect of this back pressure is to hold back the flow of the fabric, so that the fabric is not exposed in the finished packing ring. The small area between the outer edge of the packing ring and the groove 11 ensures that as the mold portions close together, the pressure applied to the mold will readily squeeze out the material at this area into the groove 11, ensuring that the face 13 of the female portion 2 will be brought into substantial engagement with the face 8 of the male portion 1.

The vent openings 14 permit the escape of any gases present in the packing ring, so that a smooth packing ring is produced, free from pockets and depressions which may otherwise be formed by the presence of gas which cannot escape.

It has been found in practice that the excess material from the packing ring tends to flow from the groove 11 into the groove 12, following the contour of the groove 12, rather than to flow laterally to the face 8 of the male portion 1.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. A mold for a cup-shaped packing ring comprising a male portion having an annular section of the contour of the interior of the ring for receiving the packing ring and having a flat face and a female portion having a recess of the contour of the exterior of the ring and provided with a flat face adapted to engage the flat face of the male portion, when the portions of the mold are brought together, the flat face of the male portion being provided with an annular shallow groove concentric with and adjacent to the packing ring in the mold and the flat face of the female portion being provided with an annular groove having its inner edge in substantial alinement with the outer edge of the shallow groove, the grooves receiving excess material which may be pressed out of the ring, when the portions of the mold are brought together.

2. A mold for a cup-shaped packing ring comprising a male portion having an annular section of the contour of the interior of the ring for receiving the packing ring and having a flat face and a female portion having a recess of the contour of the exterior of the ring and provided with a flat face adapted to engage the flat face of the male portion, when the portions of the mold are brought together, the flat face of the male portion being provided with an annular shallow groove concentric with and adjacent to the packing ring in the mold and the flat face of the female portion being provided with an annular groove having its inner edge in substantial alinement with the outer edge of the shallow groove, excess material pressed out of the ring as the mold portions are brought together first flowing to the shallow groove and then to the other groove.

3. A mold for a cup-shaped packing ring comprising a male portion having an annular section of the contour of the interior of the ring for receiving the packing ring and having a flat face and a female portion having a recess of the contour of the exterior of the ring and provided with a flat face adapted to engage the flat face of the male portion, when the portions of the mold are brought together, the flat face of the male portion being provided with an annular shallow groove concentric with and adjacent to the packing ring in the mold and the flat face of the female portion being provided with an annular groove having its inner edge in substantial alinement with the outer edge of the shallow groove, excess material pressed out of the ring as the mold portions are brought together first flowing to the shallow groove until the shallow groove is filled and then flowing to the other groove.

4. A mold for packing comprising two mold members having cooperating faces, one of said faces having a recess in which the packing is formed from plastic material, one of said faces having a shallow annular groove adjacent the periphery of said recess for receiving packing material overflowing from said recess and one of said faces having a second annular groove disposed adjacent to and exteriorly of the first said groove for receiving the material overflowing from the first said groove.

5. A mold for packing comprising two mold members having cooperating faces, one of said faces having a recess in which the packing is formed from plastic material, one of said faces having a shallow annular groove adjacent the periphery of said recess adapted to be quickly filled with excess packing material overflowing from said recess as the mold members are brought together for resisting flow of material from the recess and between said cooperating faces, and one of said faces having a second annular groove disposed adjacent to and exteriorly of the first said groove for receiving the material overflowing from the first said groove.

6. A mold for packing comprising two mold members having cooperating faces, one of said faces having a recess in which the packing is formed from plastic material, one of said faces having a shallow annular groove adjacent the periphery of said recess for receiving packing material overflowing from said recess and one of said faces having a second annular groove disposed adjacent to and exteriorly of the first said groove for receiving the material overflowing from the first said groove, said second groove having a vent passage leading to the atmosphere to permit the escape of gases therefrom.

7. A mold for packing comprising two mold members having cooperating faces, one of said faces having a recess in which the packing is formed from plastic material and from which excess packing material within the recess is discharged through the space between the cooperating faces, one of said faces having an annular groove surrounding said recess adapted to be quickly filled with excess packing material overflowing from said recess as the mold members are brought together, for resisting flow of material from said recess and between said cooperating faces, and adapted to discharge overflow material from said groove into the space between said faces, and means for bunching the overflow material as it flows from said groove.

In testimony whereof I have hereunto set my hand, this 27th day of November, 1929.

PHILIP W. DEMPSEY.